United States Patent
Larson et al.

(10) Patent No.: US 10,736,050 B2
(45) Date of Patent: Aug. 4, 2020

(54) ADJUSTING TRANSMISSION POWER OF AN ANTENNA BASED ON AN OBJECT CAUSING PATH LOSS IN A COMMUNICATION LINK

(71) Applicant: Honeywell International Inc., Morris Plains, NJ (US)

(72) Inventors: Christian Larson, Golden Valley, MN (US); Glen Backes, Maple Grove, MN (US); Logan Zvolena, St. Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/504,740

(22) Filed: Jul. 8, 2019

(65) Prior Publication Data

US 2020/0015174 A1    Jan. 9, 2020

Related U.S. Application Data

(60) Provisional application No. 62/695,624, filed on Jul. 9, 2018.

(51) Int. Cl.
*H04W 52/24* (2009.01)
*H04B 17/309* (2015.01)

(52) U.S. Cl.
CPC ........ *H04W 52/242* (2013.01); *H04B 17/309* (2015.01)

(58) Field of Classification Search
CPC ..... H04W 52/00; H04W 52/18; H04W 52/24; H04W 52/26; G01S 2007/4013; G01S 2013/0254; G01S 7/4008; G01S 7/411

USPC ........ 455/127.1, 127.2, 127.3, 127.4, 127.5, 455/575.5
See application file for complete search history.

(56) References Cited

U.S. PATENT DOCUMENTS

| | | | |
|---|---|---|---|
| 4,015,223 A | 3/1977 | Cheze | |
| 4,353,037 A | 10/1982 | Miller | |
| 5,491,715 A | 2/1996 | Flaxl | |

(Continued)

FOREIGN PATENT DOCUMENTS

| | | |
|---|---|---|
| EP | 1843477 A2 | 10/2007 |
| JP | 5790189 B2 | 6/2011 |

(Continued)

OTHER PUBLICATIONS

"U.S. Appl. No. 14/537,584, Non Final Office Action dated Sep. 8, 2016", 6 pgs.

(Continued)

*Primary Examiner* — Philip Sobutka
(74) *Attorney, Agent, or Firm* — Schwegman Lundberg & Woessner, P.A.

(57) ABSTRACT

Example implementations relate to adjusting radiofrequency transmission power of antenna devices consistent with the disclosure. For example, a non-transitory machine-readable medium storing instructions executable by a processing resource to transmit a signal using a first transmission power to query an environment surrounding an antenna device to determine whether an object is causing path loss along a communication link, and adjust a transmission power of the antenna device to a second transmission power based on a determination that an object is causing path loss along the communication link.

18 Claims, 3 Drawing Sheets

(56) References Cited

U.S. PATENT DOCUMENTS

| | | | |
|---|---|---|---|
| 5,778,308 A | 7/1998 | Sroka et al. | |
| 5,909,129 A | 6/1999 | Murphy | |
| 6,414,562 B1 | 7/2002 | Bouisse et al. | |
| 7,860,018 B2 * | 12/2010 | Raith | H04B 1/036 370/252 |
| 8,143,746 B2 | 3/2012 | Marzetta et al. | |
| 8,405,467 B2 | 3/2013 | He | |
| 8,432,234 B2 | 4/2013 | Manssen et al. | |
| 9,520,905 B2 | 12/2016 | Suzuki | |
| 9,628,044 B2 | 4/2017 | Backes et al. | |
| 9,716,311 B2 | 7/2017 | Greene | |
| 9,831,711 B2 | 11/2017 | Miyashita | |
| 10,079,432 B2 | 9/2018 | Backes et al. | |
| 10,122,388 B2 | 11/2018 | Backes et al. | |
| 10,320,299 B2 | 6/2019 | Backes et al. | |
| 10,355,662 B2 | 7/2019 | Backes et al. | |
| 2005/0110614 A1 | 5/2005 | Coates et al. | |
| 2007/0147553 A1 | 6/2007 | Bhat et al. | |
| 2007/0155347 A1 | 7/2007 | Heuermann | |
| 2007/0187804 A1 | 8/2007 | Ei et al. | |
| 2007/0197180 A1 | 8/2007 | McKinzie, III et al. | |
| 2007/0200766 A1 | 8/2007 | Mckinzie, III et al. | |
| 2010/0022203 A1 | 1/2010 | Bonnet et al. | |
| 2011/0043282 A1 | 2/2011 | Drogi et al. | |
| 2011/0086600 A1 | 4/2011 | Muhammad | |
| 2012/0038524 A1 | 2/2012 | Song | |
| 2012/0112806 A1 | 5/2012 | Dayi | |
| 2012/0133212 A1 | 5/2012 | Kamata | |
| 2013/0187712 A1 | 7/2013 | Cabanillas et al. | |
| 2013/0241301 A1 | 9/2013 | Maeda et al. | |
| 2013/0328734 A1 | 12/2013 | Thind | |
| 2014/0104132 A1 | 4/2014 | Bakalski et al. | |
| 2014/0247190 A1 | 9/2014 | Loftus | |
| 2014/0266965 A1 | 9/2014 | Herrero et al. | |
| 2014/0302797 A1 | 10/2014 | Han et al. | |
| 2015/0076920 A1 | 3/2015 | Zargham et al. | |
| 2015/0119052 A1 | 4/2015 | Caimi et al. | |
| 2015/0133064 A1 | 5/2015 | Horne et al. | |
| 2015/0172426 A1 | 6/2015 | Asrani et al. | |
| 2015/0236728 A1 | 8/2015 | Suzuki | |
| 2016/0134254 A1 | 5/2016 | Backes et al. | |
| 2016/0141096 A1 | 5/2016 | Van Den Biggelaar et al. | |
| 2016/0327634 A1 * | 11/2016 | Katz | G01S 7/411 |
| 2017/0093040 A1 | 3/2017 | Backes et al. | |
| 2017/0179996 A1 | 6/2017 | Knepper et al. | |
| 2017/0244432 A1 | 8/2017 | Ranta et al. | |
| 2017/0346178 A1 | 11/2017 | Shi et al. | |
| 2018/0159222 A1 | 6/2018 | Backes et al. | |

FOREIGN PATENT DOCUMENTS

| | | |
|---|---|---|
| WO | WO-2010/141774 A2 | 12/2010 |
| WO | WO-2013/185094 A1 | 12/2013 |
| WO | WO-2014/037994 A1 | 3/2014 |

OTHER PUBLICATIONS

"U.S. Appl. No. 14/537,584, Notice of Allowance dated Dec. 8, 2016", 5 pgs.
"U.S. Appl. No. 14/537,584, Response filed Oct. 12, 2016 to Non-Final Office Action dated Sep. 8, 2016", 8 pgs.
"U.S. Appl. No. 14/563,808, Final Office Action dated Jun. 15, 2017", 19 pgs.
"U.S. Appl. No. 14/563,808, Final Office Action dated Jul. 28, 2016", 14 pgs.
"U.S. Appl. No. 14/563,808, Interview Summary dated Mar. 6, 2017", 3 pgs.
"U.S. Appl. No. 14/563,808, Interview Summary dated May 5, 2016", 3 pgs.
"U.S. Appl. No. 14/563,808, Interview Summary dated Aug. 25, 2016", 3 pgs.
"U.S. Appl. No. 14/563,808, Non-Final Office Action dated Jan. 29, 2016", 14 pgs.
"U.S. Appl. No. 14/563,808, Non-Final Office Action dated Dec. 4, 2017", 17 pgs.
"U.S. Appl. No. 14/563,808, Non-Final Office Action dated Jan. 27, 2017", 17 pgs.
"U.S. Appl. No. 14/563,808, Notice of Allowance dated Jul. 5, 2018", 12 pgs.
"U.S. Appl. No. 14/563,808, Response filed Mar. 2, 2018 to Non-Final Office Action dated Dec. 4, 2017", 19 pgs.
"U.S. Appl. No. 14/563,808, Response filed Apr. 6, 2017 to Non-Final Office Action dated Jan. 27, 2017", 16 pgs.
"U.S. Appl. No. 14/563,808, Response filed Apr. 29, 2016 to Non-Final Office Action dated Jan. 29, 2016", 16 pgs.
"U.S. Appl. No. 14/563,808, Response filed Aug. 14, 2017 to Final Office Action dated Jun. 15, 2017", 17 pgs.
"U.S. Appl. No. 14/563,808, Response filed Aug. 30, 2016 to Final Office Action dated Jul. 28, 2016", 13 pgs.
"U.S. Appl. No. 14/863,653, Final Office Action dated Mar. 21, 2018", 9 pgs.
"U.S. Appl. No. 14/863,653, Non-Final Office Action dated Nov. 16, 2017", 11 pgs.
"U.S. Appl. No. 14/863,653, Notice of Allowance dated Jun. 11, 2018", 7 pgs.
"U.S. Appl. No. 14/863,653, Response filed Jan. 29, 2018 to Non-Final Office Action dated Nov. 16, 2017", 10 pgs.
"U.S. Appl. No. 14/863,653, Response filed May 2, 2018 to Final Office Action dated Mar. 21, 2018", 11 pgs.
"U.S. Appl. No. 15/152,946, Non-Final Office Action dated Mar. 8, 2018", 11 pgs.
"U.S. Appl. No. 15/152,946, Notice of Allowance dated Jan. 29, 2019", 8 pgs.
"U.S. Appl. No. 15/152,946, Response filed Jun. 8, 2018 to Non-Final Office Action dated Mar. 8, 2018", 10 pgs.
"U.S. Appl. No. 15/152,946, Response filed Nov. 7, 2018 to Restriction Requirement dated Sep. 14, 2018", 7 pgs.
"U.S. Appl. No. 15/152,946, Restriction Requirement dated Sep. 14, 2018", 6 pgs.
"U.S. Appl. No. 15/370,708, Corrected Notice of Allowability dated May 20, 2019", 5 pgs.
"U.S. Appl. No. 15/370,708, Examiner Interview Summary dated Feb. 4, 2019", 3 pgs.
"U.S. Appl. No. 15/370,708, Non-Final Office Action dated Nov. 27, 2018", 16 pgs.
"U.S. Appl. No. 15/370,708, Notice of Allowance dated Mar. 12, 2019", 8 pgs.
"U.S. Appl. No. 15/370,708, Response to Non-Final Office Action dated Nov. 27, 2018", 11 pgs.
"European Application Serial No. 17202361.6, Extended European Search Report dated Sep. 7, 2018", 20 pgs.
"European Application Serial No. 17202361.6, Office Action dated May 2, 2018", 8 pgs.
"European Application Serial No. 17202361.6, Response filed Apr. 10, 2019 to Extended European Search Report dated Sep. 7, 2018", 17 pgs.
"Power dividers and directional couplers", In Wikipedia, The Free Encyclopedia, [online]. Retrieved from the Internet: <URL: https://en.wikipedia.org/w/index.php?title=Power_dividers_and_directional_couplers&oldid+842181112>, (2019), 14 pgs.
Beh, Tech C., et al., "Basic Study of Improving Efficiency of Wireless Power Transfer via Magnetic Resonance Coupling Based on Impedance Matching", *2010 IEEE International Symposium on Industrial Electronics*, (Jul. 2010), 2011-2016.
Beh, Teck C., et al., "Automated Impedance Matching System for Robust Wireless Power Transfer via Magnetic Resonance Coupling", *IEEE Transactions on Industrial Electronics*, 60(9), (Sep. 2013), 3689-3697.
U.S. Appl. No. 14/537,584 U.S. Pat. No. 9,628,044, filed Nov. 10, 2014, Parameter Scanned Tunable Antenna.
U.S. Appl. No. 14/863,653 U.S. Pat. No. 10,079,432, filed Sep. 24, 2015, Parameter Scanned Tunable Antenna.
U.S. Appl. No. 15/370,708 U.S. Pat. No. 10,355,662, filed Dec. 6, 2016, Impedance Matching Using Tunable Elements.
U.S. Appl. No. 14/563,808 U.S. Pat. No. 10,122,388, filed Dec. 8, 2014, Auto-Tunable Antenna Devices.

(56) References Cited

OTHER PUBLICATIONS

U.S. Appl. No. 15/152,946 U.S. Pat. No. 10,320,229, filed May 12, 2016, Auto-Tunable Wireless Charger.

* cited by examiner

ADJUSTING TRANSMISSION POWER OF AN ANTENNA BASED ON AN OBJECT CAUSING PATH LOSS IN A COMMUNICATION LINK

TECHNICAL FIELD

The present disclosure relates to devices, systems, and methods adjusting radio frequency (RF) transmission power of an antenna device.

BACKGROUND

Many devices include an antenna to receive and/or send data to other devices. For instance, an antenna can be used to connect to the Internet, to wirelessly communicate with other devices, to send messages, etc.

Devices with antennas can be susceptible to antenna performance degradation. For example, devices that are mobile, such as handheld devices, can be susceptible to antenna performance degradation due to the proximity of the hand, head, and/or other objects which may be surrounding the radiating antenna. Antenna degradation can limit the effective communication range, and in cases of devices with automatic level control, can limit battery life due to excessive power draw of the power amplifier.

Some devices with antennas use auto-tuning to address this issue. Auto-tuning can allow the device to adjust its transmitter's tuning parameters in order to operate at the most efficient manner it can due to its immediate surroundings (e.g., several inches from the device). However, auto-tuning only finds the most efficient operating point and continues to operate at that point, even if operating at this point is insufficient for closing the communication link. Thus, devices with antennas that operate in this manner may adjust the tuning parameters to ensure that the device is operating efficiently or, in a case where the device cannot, it will decide not to transmit. The decision not to transmit may result in critical messages not being delivered by the device.

DETAILED DESCRIPTION

Figure 1B:
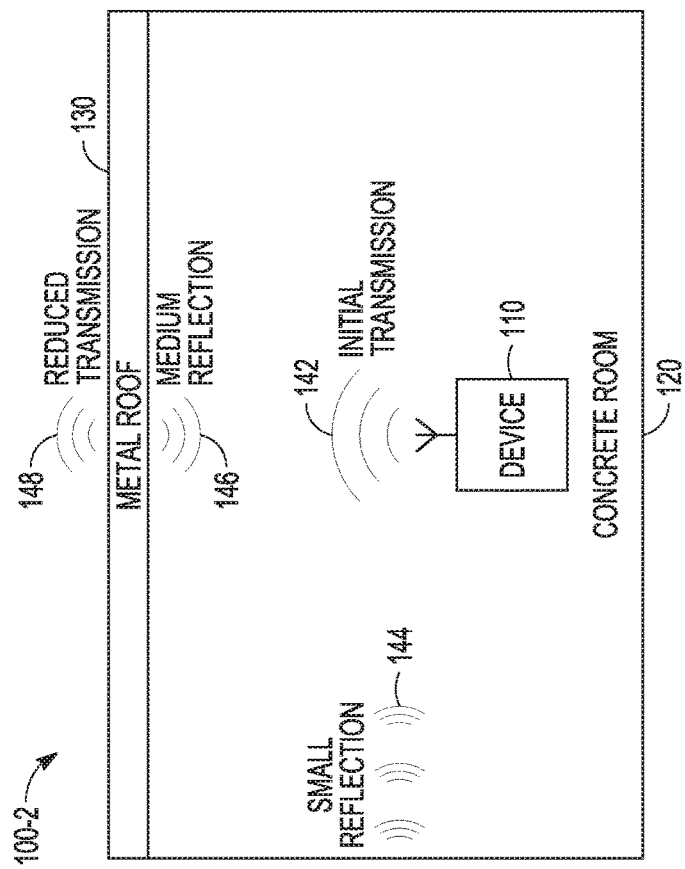
FIGS. 1A and 1B illustrate examples of environments surrounding an antenna device consistent with the disclosure.

As used herein, the term "antenna device" can, for example, refer to a device including a processor, memory, and input/output interfaces for wired and/or wireless communication. An antenna device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone, such as a smart phone, a tablet, a personal digital assistant (PDA), smart glasses, and/or a wrist-worn device (e.g., a smart watch), among other types of mobile devices.

Antenna devices, as previously described, may use auto-tuning in response to experiencing antenna performance degradation. For example, handheld devices can be susceptible to antenna performance degradation due to the proximity of the hand, head, and/or other objects which may be held close to the radiating antenna. One solution to this problem is for the antenna device to use auto-tuning, which can adjust the tuning parameters to ensure that the antenna device operates in the most efficient manner it can due to its immediate surroundings. Auto-tuning, however, can result in the antenna device not operating with a high enough transmission power capable of successfully delivering data to a receiving device (e.g. a second antenna device). For instance, the antenna device may be unable to deliver messages to the receiving device or, in some cases, the antenna device will decide not to transmit messages.

Embodiments in accordance with the present disclosure may include adjusting the transmission power of an antenna device to close the communication link allowing for the transmission of messages in non-ideal environments. For example, the antenna device can query its transmission environment beyond the near-field to determine whether an object, such as a building, is causing path loss along the communication link. Based on the determination that an object is causing path loss along the communication link, the antenna device can adjust the transmission power to close the communication link.

In some cases, adjusting the transmission power of the antenna device can include increasing the transmission power to a level that can limit the battery life of the antenna device. However, increasing the transmission power to a level capable of closing the communication link can increase performance of the antenna device to ensure that the antenna device is capable of delivering messages to a receiving device, which in some cases can be critical.

Accordingly, the disclosure is directed to adjusting the transmission power of an antenna device. Antenna devices disclosed herein may provide a way to increase transmission power to ensure that the antenna device transmits messages in non-ideal environments. Specifically, the antenna device can increase its transmission power based on a determination that an object is causing path loss along a communication link.

Figure 1A:
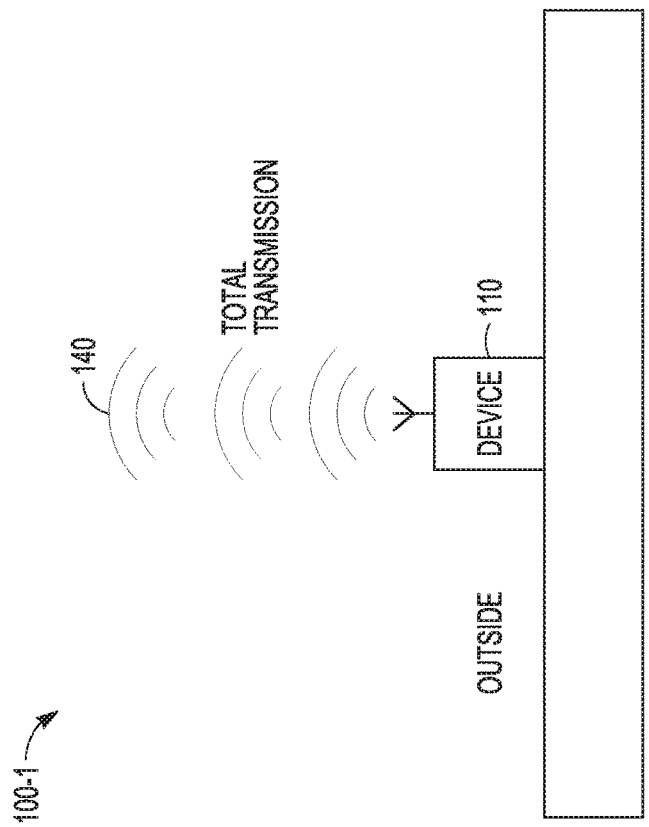

FIGS. 1A and 1B illustrate examples of environments surrounding an antenna device consistent with the disclosure. The antenna device can include an antenna. An antenna, as used herein, is an electrical device which converts electric currents into radio waves, and/or vice versa. For example, an antenna can receive a signal and produce a voltage at its terminal that can be applied to a receiver to be amplified. Example antennas can include a primary cellular antenna, a diversity cellular antenna, a global position system (GPS) antenna, a local area wireless (WIFI) antenna, a far field communication (FFC) antenna, etc.

Various types of RF transmission can depend on line of sight (LOS) between a transmitter antenna device and a receiver antenna device. Objects that can cause non-line-of-site (NLOS) conditions include buildings, trees, hills, and mountains, among other objects. Some of these objects can reflect RF signals, while some can absorb RF signals, but in either case the objects causing NLOS conditions can result in antenna performance degradation.

Performance degradation can be the result of an object introducing path loss along the communication link resulting in breakage of the communication link. A communication link can be a RF link between the antenna device and a receiving device that allows the antenna device and the receiving device to transmit and/or receive data, such as messages.

Path loss can be a reduction in transmission power of a RF signal transmitted by the antenna device. Path loss may also be due to various effects, such as free-space loss, refraction, reflection, and absorption, among other effects. As described herein, by determining that an object is causing path loss, the antenna device can increase its transmission power it is operating at to compensate for the path loss.

Further, path loss can cause a break in the communication link, for instance, when an object causes an obstruction in the communication link. Additionally, the severity of the path loss can be based on the material or size of the object disposed along the communication link. For instance, a material which acts as a good insulator and/or a good conductor can result in more severe path loss than a material that acts as a poor insulator and/or a poor conductor. Additionally, the thicker an object the more severe the path loss may be.

In view of these environmental conditions, an antenna device operates on the principle of RF reflections from its surrounding environment. As noted above, most objects will reflect some amount of RF signal, absorb some RF signal, and allow some to pass through. The amount that is absorbed, reflected, and passed depends on material properties, thickness, the frequency of the signal, and angle of incidence. In FIG. 1B, for example, objects like the metal roof 130 will reflect significantly more signal than the concrete walls 120. As explained in more detail herein, the antenna device includes an algorithm that processes the amplitude of the reflected signals and the time between the transmitted signal and the reflection. The antenna device uses that information to determine its proximity to objects that will have a negative impact on effective transmission, and the antenna device makes a decision on whether or not to increase output power.

As illustrated in FIGS. 1A and 1B, an antenna device can transmit a signal to query an environment 100-1, 100-2 surrounding the antenna device 110 to determine whether an object is causing path loss along a communication link. The antenna device 110 can query the near field and/or the far field regions of the environment 100-1, 100-2 surrounding the antenna device 110. The near and far field regions can be regions of the electromagnetic field (EM) around the antenna device.

As illustrated by FIG. 1A, in an environment 100-1 where there is not an object causing path loss along the communication link, there can be total transmission 140. Total transmission can mean that there is no performance degradation or path loss caused by an object. Thus, the antenna device 110 can communicate (e.g. deliver data) with a receiving device without adjusting its transmission power.

As illustrated by FIG. 1B, in an environment 100-2 where there is an object causing path loss along the communication link, there can be reduced transmission. Reduced transmission can mean that there is performance degradation or path loss caused by an object. Thus, the antenna device 110 can adjust the transmission power it is operating at to communicate with a receiving device. For example, as illustrated in FIG. 1B, the antenna device 110 can determine an object, such as a concrete wall 120 or a metal roof 130, is causing path loss along the communication link resulting in degraded performance and potential breakage in the communication link. Increasing the transmission power of the antenna device 110 can close the break in the communication link, allowing the antenna device 110 to communicate with the receiving device.

As described herein, the antenna device 110 can detect an object by transmitting an RF signal 140, 142 and determining whether the transmitted RF signal reflects off an object that is present in the environment surrounding the antenna device 110. The reflected signal can either be a small reflection 144 or a medium reflection 146. These reflections 144 and 146 result in a reduced transmission 148 of the transmitted signal 140, 142. Upon receiving the reflected RF signal, the antenna device 110 can determine the amount of time that passes between when the antenna device transmits the signal and receives the reflected signal, along with the amplitude of the received signal to determine whether to adjust the transmission power of the antenna device.

Upon determining that an object is causing path loss along the communication link, the antenna device 110 can notify a user to manually increase the transmission power of the antenna device or the antenna device can automatically adjust its tuning parameters to increase its transmission power to a level that will close the communication link. While increasing the transmission power the antenna device 110 is operating at can limit the battery life of the antenna device, the antenna device can successfully deliver messages to the receiving device.

Figure 2:
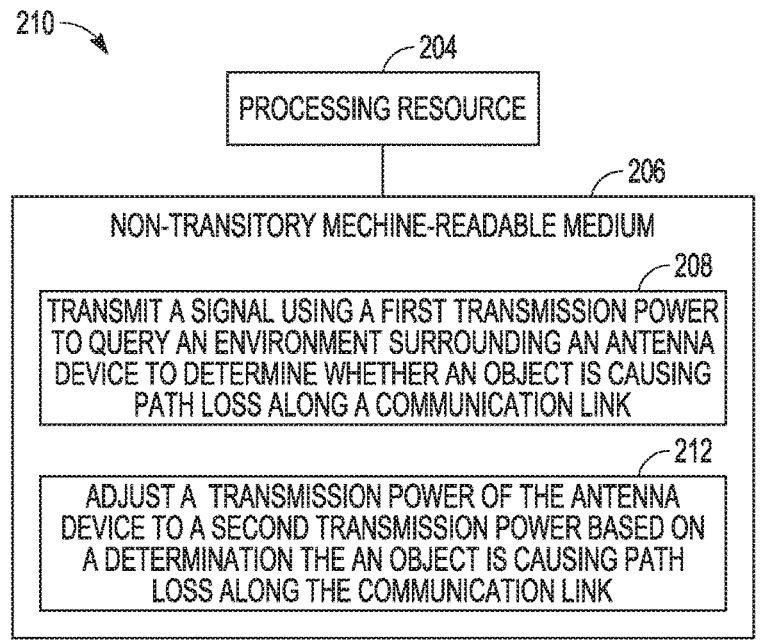
FIG. 2 illustrates an example of a diagram of a non-transitory machine-readable medium and processing resource for adjusting transmission power of antenna devices consistent with the disclosure.

FIG. 2 illustrates an example of a diagram 210 of a non-transitory machine-readable medium 206 and processing resource 204 for adjusting transmission power of antenna devices consistent with the disclosure. A memory resource, such as the non-transitory machine-readable medium 206, may be used to store instructions (e.g., 208, 212) executed by the processing resource 204 to perform the operations as described herein.

A processing resource 204 may execute instructions stored on the non-transitory machine-readable medium 206. The non-transitory machine-readable medium 206 may be any type of volatile or non-volatile memory or storage, such as random access memory (RAM), flash memory, read-only memory (ROM), storage volumes, a hard disk, or a combination thereof.

The machine-readable medium 206 may store instructions 208, 212 executable by the processing resource 204 to transmit a signal using a first transmission power to query an environment 100-1, 100-2 surrounding an a device 110 to determine whether an object is causing path loss along a communication link. The antenna device 110 can transmit a signal in response to a reference signal. The reference signal can include the signal (e.g., radio frequency signal/power) that drives the antenna to transmit a signal. That is, the antenna can be driven to transmit a signal by a reference signal from an amplifier.

The antenna can include a tunable antenna. That is, the resonant frequency of the antenna can be shifted. For example, the antenna device can include a tunable control circuit. A tunable control circuit element can include a hardware component that can shift the resonant frequency of the antenna in response to a voltage applied to it.

As previously described, the antenna device 110 can transmit a signal to determine whether the antenna device is in an environment 100-1, 100-2 containing objects that can cause a break in the communication link resulting in path loss along the communication link. For instance, objects such as a concrete wall 120 or a metal roof 130 in FIG. 111 can cause a reflection or an absorption of the transmitted signal 140, 142, which can cause a break in the communication link between the antenna device and a receiving device.

The path loss along the communication link can decrease the power transmitted to the receiving device leading to a breakage in the communication link. A decrease in the transmission power of the transmitted signal can prevent the antenna device from communicating with the receiving device.

To determine whether there are objects within the environment 100-1, 100-2, which can include near-field and far-field regions, that can cause path loss along the communication link, the antenna device 110 can query the environment by transmitting a signal 140,142 using a first transmission power. Upon transmitting the signal, if there are objects in the environment along the communication link, the signal can reflect off the objects and return to the antenna device 110.

The antenna device 110 can be configured to receive the reflected signal. The antenna device 110 can then determine whether the object is causing path loss along the communication signal, and in addition, the severity of the path loss along the communication link. The antenna device 110 can determine whether the object is causing path loss that will prevent the antenna device 110 from communicating with receiving devices based on several factors. These factors can include the period of time between when the signal was transmitted and received by the antenna device 110 and the amplitude of the received signal, among other factors.

The antenna device 110 can determine the period of time between when the signal is transmitted and received by the antenna device and store a value that corresponds to the period of time within the antenna device.

Similarly, the greater the amplitude of the received signal, the greater the path loss may be. The antenna device 110 can also determine the amplitude of the received signal and store a value that corresponds to the amplitude of the received signal. While the content of this disclosure describes determining whether an object is causing path loss along the communication link based on the period of time between the transmitted and received signals and/or the amplitude of the received signal, other factors that are capable of indicating path loss along the communication link can be analyzed.

The antenna device 110 can determine whether there is path loss along the communication signal, as well as the severity of the path loss. For example, the antenna device 110 can determine, based on the values corresponding to the time period between the signal being transmitted and received and/or the amplitude of the received signal, an overall value that corresponds to the level of path loss. Therefore, a value or range of values can indicate no path loss along the communication, while a different value or set of values can indicate path loss along the communication link.

The machine-readable medium 206 may store instructions 212 executable by the processing resource 204 to adjust a transmission power of the antenna device 110 to a second transmission power based on a determination that an object is causing path loss along the communication link. A threshold value of path loss can be determined to indicate adjusting the transmission power of the antenna device 110 to compensate for the path loss and close the break in the communication link.

For example, if the antenna device 110 determines that the value corresponding to path loss meets or exceeds the threshold value, the antenna device 110 can notify a user to adjust the transmission power of the antenna device. As described herein, the antenna device 110 can also automatically adjust the transmission power. The transmission power of the antenna device 110 can be adjusted from the first transmission power to a second transmission power, where the second transmission power can be greater than the first transmission power. The transmission power of the device can be increased to a level that compensates for the path loss.

For example, the antenna device 110 can be capable of operating at more than one transmission power level, where the transmission power levels can correspond to the determined value of path loss. In such an example, the antenna device 110 can be set to operate at a first transmission power when the value of path loss is a first value, at a second transmission power when the value of path loss is a second value, at a third transmission power when the value of path loss is a third value, and so on.

Thus, if the antenna device 110 determines that the value corresponding to overall path loss meets or exceeds the threshold value of path loss, the antenna device 110 can adjust the transmission power to the transmission power that corresponds to the overall value of path loss. The transmission power that corresponds to the overall value of path loss can close the break in the communication link and compensate for the path loss, which can allow the antenna device 110 to transmit and deliver messages to the receiving device.

In another example, if the antenna device 110 determines that the value corresponding to path loss does not meet or exceed the threshold value, the antenna device can continue to operate at the first transmission power. Thus, the antenna device 110 can transmit and deliver messages to the receiving device without limiting the battery power of the antenna device.

Figure 3:
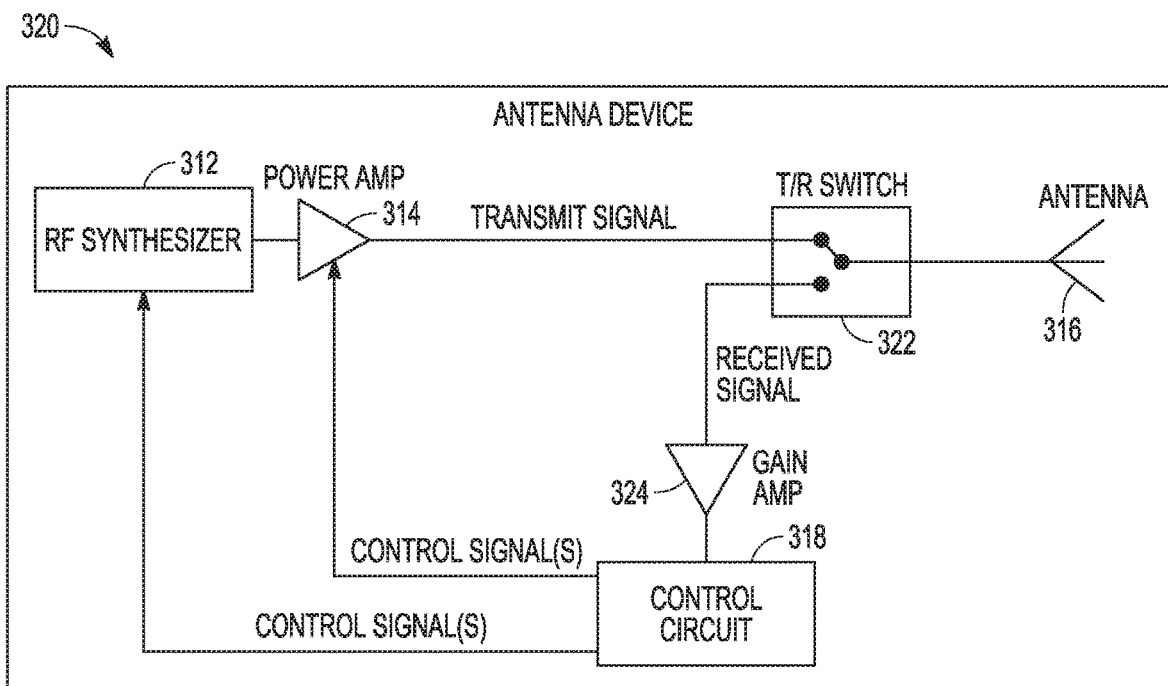
FIG. 3 illustrates an example antenna device consistent with the disclosure.

FIG. 3 illustrates an example antenna device 320 consistent with the disclosure. The antenna device 320 can include an RE synthesizer 312, a power amplifier 314, an antenna 316, a control circuit 318, a transmit/receive (T/R) switch 322, and a gain amplifier 324.

The antenna 316 can be configured to transmit a signal along a communication link. As described herein, the antenna 316 can include a tunable antenna. That is, the resonant frequency of the antenna can be shifted. For example, the antenna device can include a control circuit 318, where the control circuit can include a hardware component that is capable of shifting the resonant frequency of the antenna in response to a voltage applied to it.

The T/R switch 322 can be configured to switch the antenna device 320 between a transmit mode and a receive mode. For instance, the antenna device 320 can transmit a signal when in transmit mode and receive a reflected signal when in receive mode.

In one example, when the antenna 316 is set to transmit mode via the T/R switch 322, the antenna device 320 can transmit a signal to a receiving device and/or to query the environment surrounding the antenna device 320. For instance, the RF synthesizer 312 can generate a RF frequency signal to drive the antenna 316 to transmit the signal. The generated frequency signal can pass through the power amplifier 314 and the T/R switch 322 to reach the antenna 316. The power amplifier can amplify the RF frequency signal generated by the RF synthesizer 312.

The power amplifier 314 can include tuning parameters that can be adjusted, where adjusting the tuning parameters of the power amplifier 314 can adjust the transmit power of the antenna device 320. For instance, in one example, adjusting the tuning parameters of the power amplifier 314 can decrease the amplitude of the RF frequency signal, thus deceasing the transmit power of the antenna device 320. In another example, adjusting the tuning parameters of the power amplifier 314 can increase the amplitude of the RF frequency signal, thus increasing the transmit power of the antenna device 320.

In another example, when the antenna 316 is set to receive mode via the T/R switch 322, the antenna device 320 can receive a signal that has reflected off an object within the environment surrounding the antenna device 320, as well as signals transmitted by additional antenna devices. The received signal can be received by the antenna 316 and passed through the gain amplifier 324. The gain amplifier 324 can amplify the received signal when the antenna device 320 is set to receive mode for analyzing by the control circuit 318.

The control circuit 318 can be configured to determine whether an object is causing path loss along the communication link. As described herein, path loss may occur along the communication link as a result of an object obstructing the transmission path potentially leading to a communication link breakage. The control circuit 318 can determine whether there is an object causing path loss along the communication link based on data retrieved from the received signal. For instance, the control circuit 318 can determine whether path loss is occurring based on a period of time between the signal being transmitted and received by the antenna device 320 and/or the amplitude of the received signal.

When the control circuit 318 receives the reflected signal, the control circuit 318 can store a value corresponding to the period of time between the signal was transmitted and received by the antenna device 320 and/or the amplitude of the received signal. The control circuit 318 can then determine an overall path loss value based on a value corresponding to the time period between transmitting and receiving the signal and/or the amplitude of the received signal.

The control circuit 318 can also be configured to determine whether to adjust the transmission power of the antenna device based on the determination of whether an object is causing path loss along the communication link. For instance, if the antenna device 110 determines that the overall path loss value meets or exceeds the threshold value of path loss, the antenna device can notify a user to adjust the transmission power of the antenna device or send instructions to the power amplifier 314 to adjust the transmission power of the antenna device 320.

For example, if the control circuit 318 determines that the overall path loss value meets or exceeds the threshold value of path loss, the control circuit 318 can determine the level that the transmission power level needs to be increased to. The control circuit 318 can then send instructions to the power amplifier 314 to tune its parameters such that the transmission power of the antenna device 320 increases to a transmission power level that corresponds to the path loss value. The transmission power level can increase to a power transmission level that can compensate for the path loss along the communication link.

Once in transmit mode, the RF synthesizer 312 can then generate a RF frequency signal to drive the antenna 316 to transmit the signal at the increased transmit power. Transmitting the signal at the increased transmit rate can limit the battery life of the antenna device, while allowing the antenna device to communicate with the receiving device.

In another example, if the control circuit 318 determines that the overall path loss value does not meet or exceed the threshold value of path loss, the control circuit 318 can allow the power amplifier 314 to continue to operate at the same parameters. Thus, the antenna device 320 will continue to transmit signals at a transmission power that does not limit the battery life of the antenna device 320, while communicating with the receiving device.

Figure 4:
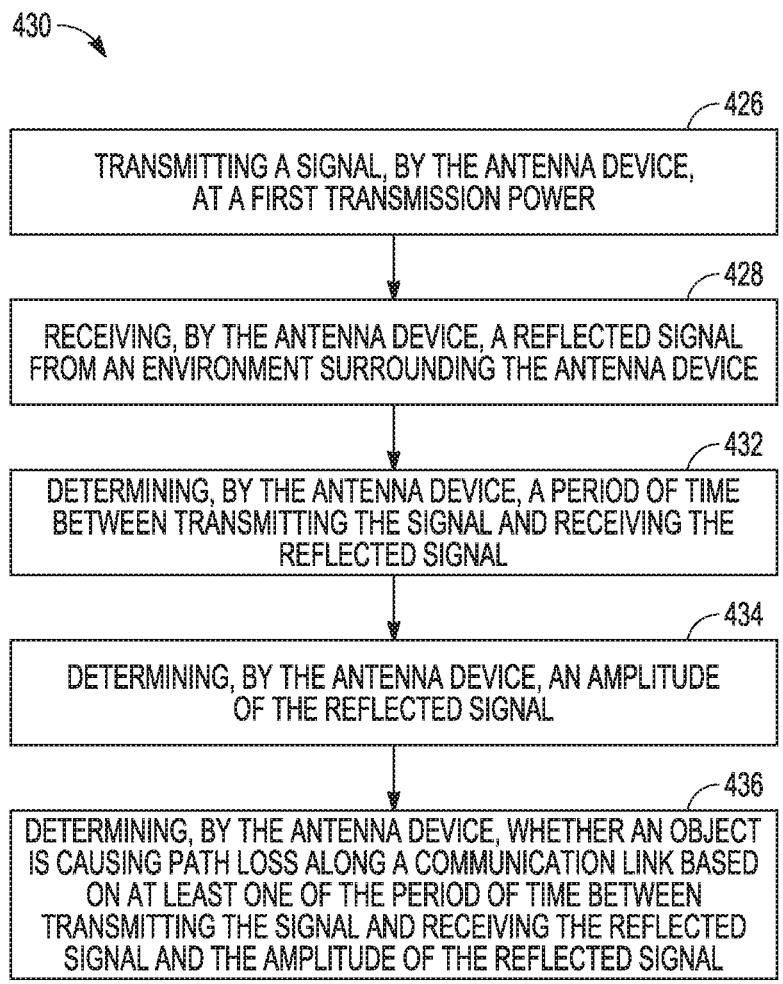
FIG. 4 illustrates an example of a method for adjusting transmission power of antenna devices consistent with the disclosure.

FIG. 4 illustrates an example of a method 430 for adjusting radio frequency transmission power of antenna devices consistent with the disclosure.

At 426, the method 430 may include transmitting a signal, by the antenna device 110, at a first transmission power along a communication link. As described herein, the antenna device 110 can transmit a signal at a first transmission power to query an environment surrounding the antenna device. Querying the environment can include determining whether objects are present within the environment that are capable of causing path loss along the communication link.

At 428, the method 430 may include receiving, by the antenna device 110, a reflected signal from an environment surrounding the antenna device. The antenna device 110 can be configured to receive a signal that reflects off an object within the environment surrounding the antenna device, where the signal that reflects off the object is the signal transmitted by the antenna device. As described herein, the antenna device 110 can determine whether the object which the signal reflected off has caused path loss along the communication link based on factors associated with the transmitted and received signal.

At 432, the method 430 may include determining, by the antenna device 110, an amount of time between transmitting the signal and receiving the reflected signal. For instance, the antenna device 110 can be configured to store data relating to the transmitted and received signal, such as a value indicating the period of time between the signal being transmitted and received by the antenna device. The antenna device 110 can then utilize the stored value indicating the period of time between the signal being transmitted and received to determine whether there is path loss along the communication link.

At 434, the method 430 may include determining, by the antenna device 110, an amplitude of the received signal. For instance, the antenna device 110 can be configured to store data relating to the amplitude of the transmitted and received signal. The antenna device 110 can measure the amplitude of both the transmitted and received signal and store a value indicating the amplitude of the received signal. The antenna device 110 can then utilize the stored value indicating the amplitude of the received signal to determine whether there is path loss along the communication link.

At 436, the method 430 may include determining, by the antenna device 110, whether an object is causing path loss along the communication link based on at least one of the period of time between transmitting the signal and receiving the reflected signal and the amplitude of the received signal. As described herein, the antenna device 110 can be configured to utilize stored data corresponding to the period of time between when the signal is transmitted and received and/or the amplitude of the received signal to determine whether there is path loss along the communication link.

The antenna device 110 can analyze these data to determine an overall value that corresponds to the level of path loss along the communication link. A threshold value can be determined that indicates that the transmission power will need to be adjusted to allow the antenna device to communicate with the receiving device.

For example, if the antenna device 110 determines that the value corresponding to path loss meets or exceeds the threshold value, the antenna device 110 can notify a user to adjust the transmission power of the antenna device. The transmission power of the antenna device 110 can be adjusted from the first transmission power to a second transmission power, where the second transmission power can be greater than the first transmission power. The transmission power can be increased to a level that is predetermined based on the path loss value. Thus, the antenna device 110 can operate at a transmission power that can allow the antenna device to transmit and deliver messages to the receiving device.

In another example, if the antenna device 110 determines that the value corresponding to path loss does not meet or exceed the threshold value, the antenna device 110 can continue to operate at the first transmission power. Thus, the antenna device 110 can transmit and deliver messages to the receiving device without limiting the battery power of the antenna device.

In another example, the antenna device 110, 320 sends a short transmission pulse. After the transmission of this pulse, the T/R switch 322 switches the antenna device 110, 320 into a receive mode. This switching normally takes less than 5 nanoseconds. Thereafter, the antenna device 110, 320 begins receiving reflected signals from the surrounding environment. The received signal is amplified through the gain amplifier 324 and passed to the control circuit 318. An algorithm, which is based on the time between the transmitted signal and the received reflected signal, as well as the amplitude of the received reflected signal, makes a determination as to whether the surrounding environment warrants an increase in transmit power in order to increase the chances of a successful RF link. The algorithm uses the time between the transmitted signal and the reflected signal and the amplitude of the received signal to determine the proximity of the antenna device to objects that will have a negative impact on effective transmission, and makes a decision on whether or not to increase output power.

In another embodiment, the algorithm can require that both the reflection time threshold and the amplitude threshold are met, that only the reflection time threshold is met if it is above a certain threshold, that only the amplitude threshold is met if it is above a certain threshold, or other combinations of reflection time and amplitude thresholds. If an increase in RF power is warranted, based on the reflection time and/or the amplitude, the control circuit 318 changes the tuning parameters of the power amplifier 314 thereby increasing the RF transmit power, and the antenna device 110, 320 then transmits data at an elevated power level. If the antenna device 110, 320 determines that there is no need for increased power, the data are transmitted at the current or normal power level.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A non-transitory machine-readable medium storing instructions executable by a processing resource to:
   transmit a signal using a first transmission power to query an environment surrounding an antenna device to determine whether an object is causing path loss along a communication link; and
   adjust a transmission power of the antenna device to a second transmission power based on a determination that an object is causing path loss along the communication link;
   wherein adjusting the transmission power from the first transmission power to the second transmission power compensates for the path loss along the communication link; and
   wherein the second transmission power is greater than the first transmission power.

2. The medium of claim 1, further including instructions to determine a period of time between transmitting the signal and receiving a reflected signal.

3. The medium of claim 2, further including instructions to determine an amplitude of the reflected signal received by the antenna device.

4. The medium of claim 1, comprising determining a value related to time or amplitude loss of the signal, comparing the value to a stored value; and transmitting the signal at the second transmission power when the value exceeds the stored value.

5. The medium of claim 1, wherein querying the environment surrounding the antenna device includes querying the far-field environment surrounding the antenna device.

6. The medium of claim 1, further including instructions to transmit a message using the second transmission power.

7. An antenna device, comprising:
   an antenna configured to transmit a signal along a communication link; and
   a control circuit configured to:
      determine whether an object is causing path loss along the communication link based on the period of time between transmitting the signal and receiving the reflected signal and the amplitude of the reflected signal; and
      determine whether to adjust the transmission power of the antenna device based on the determination of whether an object is causing path loss along the communication link;
      wherein the adjustment of the transmission power compensates for the path loss along the communication link; and
      wherein the adjustment of the transmission power results in a higher transmission power.

8. The antenna device of claim 7, wherein the antenna device includes a power amplifier to amplify the signal, wherein amplifying the signal includes increasing the amplitude of the signal.

9. The antenna device of claim 7, wherein the antenna device includes a transmit/receive (T/R) switch to switch the antenna device between transmit mode and receive mode, wherein the antenna device transmits a signal when in transmit mode and receives a reflected signal when in receive mode.

10. The antenna device of claim 7, wherein the antenna device includes a gain amplifier to amplify the received signal when in receive mode for analyzing by the control circuit.

11. The antenna device of claim 10, wherein changing the tuning parameters of the power amplifier adjusts the RF transmit power of the antenna device.

12. The antenna device of claim 10, wherein the power amplifier receives instructions from the control circuit to increase the RF transmit power of the antenna device in response to a determination that an object is causing path loss along the communication link.

13. The antenna device of claim 7, wherein the antenna device includes an RF synthesizer to generate a RF frequency signal to drive the antenna to transmit the signal.

14. A method, comprising:
   transmitting a signal, by an antenna device, at a first transmission power;
   receiving, by the antenna device, a reflected signal from an environment surrounding the antenna device, determining, by the antenna device, a period of time between transmitting the signal and receiving the reflected signal;
   determining, by the antenna device, an amplitude of the received signal;
   determining, by the antenna device, whether an object is causing path loss along a communication link based on at least one of the period of time between transmitting the signal and receiving the reflected signal and the amplitude of the reflected signal; and
   adjusting the first transmission power to a second transmission power to compensate for the path loss along the communication link; and
   wherein the second transmission power is greater than the first transmission power.

15. The method of claim 14, wherein adjusting the transmission power from the first transmission power to the second transmission power limits the battery life of the antenna device.

16. The method of claim 14, further including notifying, by the antenna device, a user to adjust the transmission power from the first transmission power to the second transmission power.

17. The method of claim 14, wherein the first transmission power and the second transmission power are predetermined.

18. The method of claim 14, further including transmitting a message, by the antenna device, using the first transmission power.

* * * * *